(12) United States Patent
Freund et al.

(10) Patent No.: US 8,687,470 B2
(45) Date of Patent: Apr. 1, 2014

(54) OPTICAL DISK PLAYBACK DEVICE WITH THREE-DIMENSIONAL PLAYBACK FUNCTIONALITY

(75) Inventors: Joseph Michael Freund, Fogelsville, PA (US); Diego P. deGarrido, Langhorne, PA (US)

(73) Assignee: LSI Corporation, San Jose, CA (US)

( * ) Notice: Subject to any disclaimer, the term of this patent is extended or adjusted under 35 U.S.C. 154(b) by 232 days.

(21) Appl. No.: 13/279,975

(22) Filed: Oct. 24, 2011

(65) Prior Publication Data

US 2013/0100788 A1  Apr. 25, 2013

(51) Int. Cl.
*G11B 7/00* (2006.01)

(52) U.S. Cl.
USPC ...................................... 369/44.37; 369/103

(58) Field of Classification Search
USPC ......................................................... 369/103
See application file for complete search history.

(56) References Cited

U.S. PATENT DOCUMENTS

| | | | |
|---|---|---|---|
| 5,510,832 A | 4/1996 | Garcia | |
| 5,682,437 A | 10/1997 | Okino et al. | |
| 6,445,833 B1 | 9/2002 | Murata et al. | |
| 6,584,219 B1 | 6/2003 | Yamashita et al. | |
| RE39,342 E | 10/2006 | Starks et al. | |
| 2001/0015942 A1* | 8/2001 | Maeda | 369/47.17 |
| 2001/0050892 A1* | 12/2001 | Takahashi et al. | 369/112.1 |
| 2002/0150015 A1* | 10/2002 | Matos | 369/53.1 |
| 2003/0103136 A1 | 6/2003 | Stanton | |
| 2005/0259147 A1 | 11/2005 | Nam et al. | |
| 2007/0223348 A1* | 9/2007 | Sasaki | 369/103 |
| 2008/0198722 A1* | 8/2008 | Weirauch | 369/100 |
| 2009/0102914 A1* | 4/2009 | Collar et al. | 348/46 |
| 2010/0103165 A1 | 4/2010 | Lee et al. | |
| 2010/0103168 A1 | 4/2010 | Jung et al. | |
| 2010/0266198 A1 | 10/2010 | Kim et al. | |
| 2010/0303442 A1 | 12/2010 | Newton et al. | |
| 2011/0069152 A1 | 3/2011 | Wang et al. | |

FOREIGN PATENT DOCUMENTS

| | | |
|---|---|---|
| EP | 2259585 A2 | 12/2010 |
| JP | 8172646 A | 7/1996 |
| JP | 8289328 A | 11/1996 |
| JP | 8331598 A | 12/1996 |
| JP | 9116930 A | 5/1997 |
| KR | 20090037247 A | 4/2009 |
| KR | 20100046584 A | 5/2010 |
| MX | PA05012792 A | 5/2007 |
| WO | 03049038 A1 | 6/2003 |
| WO | 2010050691 A2 | 5/2010 |

\* cited by examiner

*Primary Examiner* — Aneeta Yodichkas
(74) *Attorney, Agent, or Firm* — Ryan, Mason & Lewis, LLP

(57) ABSTRACT

An optical disk playback device comprises one or more lasers, an optical assembly, an optical detector, and controller circuitry coupled to the optical detector. The optical assembly is configured to direct incident light from the one or more lasers so as to form first and second scanning spots on a surface of an optical disk, and is further configured to direct corresponding reflected light from the first and second scanning spots on the surface of the optical disk to the optical detector. The optical detector is configured to process the reflected light from the first and second scanning spots to generate respective first and second data streams, and the controller circuitry is configured to generate a three-dimensional image signal from the first and second data streams.

20 Claims, 3 Drawing Sheets

OPTICAL DISK PLAYBACK DEVICE WITH THREE-DIMENSIONAL PLAYBACK FUNCTIONALITY

FIELD OF THE INVENTION

The present invention relates generally to optical disk playback devices, and more particularly to techniques for configuring such devices to generate image signals using information read from an optical disk.

BACKGROUND OF THE INVENTION

Standardized optical disk storage formats have recently evolved from Digital Versatile Disk (DVD) to Blu-ray. A Blu-ray disk is read using a blue laser having a wavelength of 405 nanometers, significantly shorter than the 650 nanometer red laser used to read DVDs. Information can therefore be stored at a much higher density on Blu-ray disks. For example, a single layer Blu-ray disk can store about 25 Gigabytes (GB) of data, compared to about 5 GB for a DVD. Higher storage densities can be achieved by configuring the optical disk to include multiple storage layers, as is well known.

It is also known to store three-dimensional (3D) image information for movies or other types of content on Blu-ray disks and other optical disks. A 3D optical disk playback device can read such information from the optical disk and provide a corresponding 3D image signal output for presentation on a television or other display device, thereby providing a 3D viewing experience to its users. Unfortunately, in order to obtain this 3D viewing experience, a given user typically must not only purchase both a 3D optical disk playback device and other associated equipment such as a 3D television, but that user must also buy 3D optical disks that store 3D image information, even though he or she may already have exactly the same movies or other content stored in two-dimensional (2D) image format on 2D optical disks. This is because existing optical disk playback devices are generally unable to generate 3D image signals solely from the stored 2D image information on a 2D optical disk.

Accordingly, a need exists for an optical playback device that can generate a 3D image signal from 2D image information stored on an optical disk, without requiring any change to the optical disk itself or to the information stored on that optical disk, so as to thereby save users the expense of upgrading their existing 2D content libraries.

SUMMARY OF THE INVENTION

An illustrative embodiment of the present invention provides an optical disk playback device that has 3D playback functionality in which a 3D image signal can be generated solely from stored 2D image information on a 2D optical disk.

In one aspect of the invention, an optical disk playback device comprises one or more lasers, an optical assembly, an optical detector, and controller circuitry coupled to the optical detector. The optical assembly is configured to direct incident light from the one or more lasers so as to form first and second scanning spots on a surface of an optical disk, and is further configured to direct corresponding reflected light from the first and second scanning spots on the surface of the optical disk to the optical detector. The optical detector is configured to process the reflected light from the first and second scanning spots to generate respective first and second data streams, and the controller circuitry is configured to generate a three-dimensional image signal from the first and second data streams.

The first and second scanning spots may at least partially overlap one another on the surface of the optical disk. In one or more of the embodiments, the 3D playback functionality may be provided at least in part by introducing a phase shift between incident light from first and second lasers used to form the respective first and second scanning spots on the surface of the optical disk. For example, such a phase shift may be introduced by configuring the optical assembly such that polarization of the incident light from the first laser is approximately 90° out of phase with polarization of the incident light from the second laser. In one or more other embodiments, the incident light from the first and second lasers may have substantially the same polarization, but the 3D playback functionality may be provided at least in part by the controller circuitry introducing at least one of a phase offset and a color offset between an image generated from the first data stream and an image generated from the second data stream.

The first and second lasers may both have substantially the same wavelength, or may operate at different wavelengths. For example, the first and second lasers may comprise a pair of blue lasers having wavelengths of approximately 400 nanometers, or alternatively a pair of red lasers having wavelengths of approximately 650 nanometers. In arrangements of this type, both lasers may have their wavelengths particularly adapted for reading stored information from a type of optical disk that is not otherwise configured for 3D playback, such as a Blu-ray or DVD optical disk with only 2D image information configured for 2D playback.

In other embodiments, the first and second scanning spots may be generated using incident light from a single laser, for example, through appropriate configuration of the optical assembly to include one or more beam splitters.

Advantageously, an optical disk playback device in an illustrative embodiment can generate 3D image signals solely from 2D image information stored on a 2D optical disk. Thus, users can be provided with a 3D viewing experience using their existing 2D optical disks, thereby avoiding the trouble and expense of upgrading their libraries of 2D optical disks to a 3D stored information format.

DETAILED DESCRIPTION OF THE INVENTION

The invention will be illustrated herein in conjunction with an exemplary optical disk playback system that advantageously incorporates 3D playback functionality in which 3D output signals can be generated solely from 2D image information stored on a 2D optical disk. It should be understood, however, that the invention is not limited to the particular systems and techniques shown and described. The present invention is more generally applicable to any optical disk playback system in which improved playback mode flexibility is desired, and may be implemented using components other than those specifically shown and described in conjunction with the illustrative embodiments.

Figure 1:
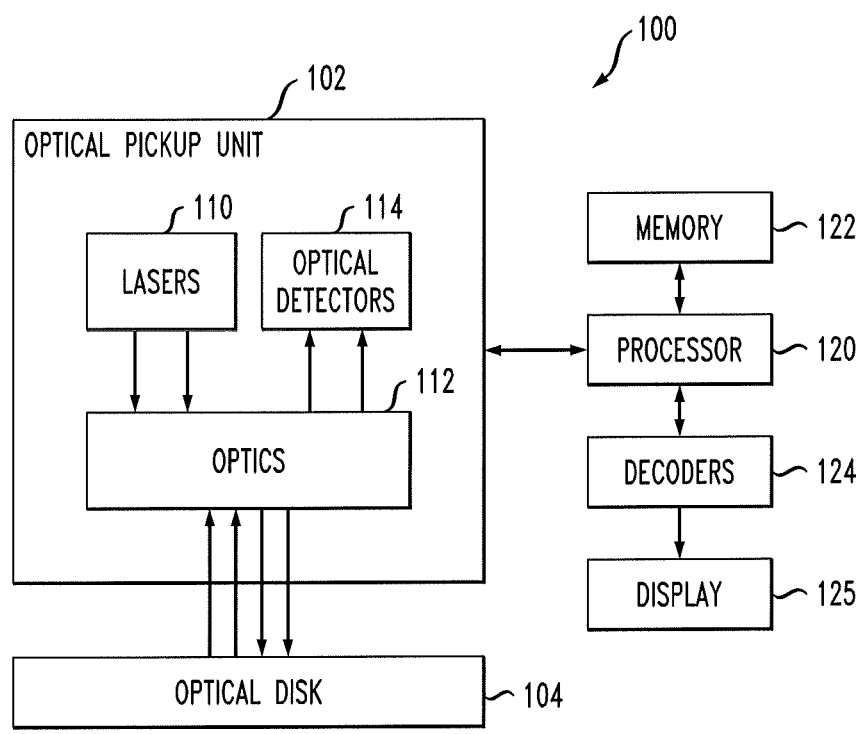
FIG. 1 is a block diagram of an optical disk playback system that incorporates 3D playback functionality in an illustrative embodiment of the invention.

FIG. 1 shows an optical disk playback system 100 in accordance with an illustrative embodiment of the invention. The playback system 100 in this embodiment more specifically comprises an optical pickup unit 102 that reads stored information from an optical disk 104. The optical pickup unit may also be configured to write information to a recordable optical disk, although such functionality is not a requirement of the present invention. In a typical configuration, the optical disk 104 is inserted in a disk drive which controls the rotation of the disk as well as the positioning of the optical pickup unit 102 relative to grooves of the disk. The drive mechanisms and associated electronics for controlling rotation of the optical disk 104 and positioning of the optical pickup unit 102 are omitted from the figure for clarity and simplicity of illustration, but may be assumed to be implemented in a conventional manner.

The optical pickup unit 102 in the present embodiment comprises lasers 110, optics 112 and optical detectors 114. It will be assumed without limitation that there are at least first and second lasers and at least first and second optical detectors, although other numbers of lasers and detectors can be used in other embodiments. The first and second lasers may both have substantially the same wavelength, or may operate at different wavelengths. For example, both the first and second lasers may have wavelengths particularly adapted for reading stored information from a type of optical disk that is not otherwise configured for 3D playback, such as a Blu-ray or DVD optical disk with only 2D image information configured for 2D playback. Multiple layer optical disks of these and other formats may also be used.

In one or more of the illustrative embodiments, it will be further assumed that the lasers 110 comprise a pair of lasers having substantially the same wavelength, such as a pair of blue lasers having wavelengths of approximately 400 nanometers suitable for reading stored information from a Blu-ray optical disk, or a pair of red lasers having wavelengths of approximately 650 nanometers suitable for reading stored information from a DVD optical disk. As indicated previously, other embodiments may utilize a combination of two or more lasers having distinct wavelengths.

It may also be assumed in one or more of the illustrative embodiments that the optical disk 104 is a conventional 2D optical disk, such as a 2D Blu-ray optical disk or a 2D DVD optical disk, where the disk stores 2D image information but is not otherwise specially configured in any way for 3D playback.

The optics 112 may be viewed as an example of what is more generally referred to herein as an "optical assembly." The term "optical assembly" as used herein is intended to be broadly construed, and may comprise any arrangement of optical elements used to direct light to and from the optical disk 104, and may also include associated structural, mechanical or electrical elements. For example, an optical assembly may comprise entirely separate sets of optics associated with the respective first and second lasers, or may utilize at least a subset of its optical elements to process light from both the first and second lasers. As another example, an optical assembly as the term is broadly used herein may be configured to generate multiple incident light beams from the output of a single laser. It should therefore be appreciated that the present invention does not require any particular arrangement of optics for directing light to and from the optical disk, even though a more detailed example of one possible embodiment of such optics will be described in conjunction with FIG. 2.

The optical pickup unit 102 is coupled to a processor 120 which controls the operation of the optical pickup unit and processes signals supplied by and delivered to that unit. The processor 120 may comprise, by way of example, a microprocessor, a digital signal processor (DSP), an application-specific integrated circuit (ASIC), a field-programmable gate array (FPGA), or other integrated circuit device, as well as portions or combinations of such devices. The processor 120 may be viewed as an example of what is more generally referred to herein as "controller circuitry."Such controller circuitry, although shown as separate from the optical pickup unit 102 in the present embodiment, may be implemented at least in part within the optical pickup unit in other embodiments. As the term is used herein, "controller circuitry" may therefore encompass, again by way of illustrative example and without limitation, disk drive electronics, signal processing electronics, and associated processing and memory circuitry, as well as one or more related electromechanical elements utilized to control positioning of the optical pickup unit 102 relative to the surface of the optical disk 104.

The controller circuitry as described above is assumed to be coupled to outputs of the optical detectors 114 and to receive respective detected signals therefrom for further processing associated with 3D playback, and may additionally be coupled to other elements of the optical pickup unit, such as control inputs of the lasers 110.

Also associated with the processor 120 in the optical playback system 100 is memory 122 and decoders 124. The memory 122 stores executable code that may be executed by processor 120 in implementing at least a portion of the 3D playback functionality of the optical disk playback system. The memory 122 may comprise electronic memory such as random access memory (RAM) or read-only memory (ROM), in any combination, and is an example of what is more generally referred to herein as a "computer-readable storage medium."

The decoders 124 may comprise, for example, separate DVD and Blu-ray decoders in an embodiment designed to support playback of both DVD and Blu-ray optical disks. Such decoders may include, for example, H.264, MPEG-2 and/or MPEG-4 decoding functionality, or other types of decoding functionality, as required to support one or more particular video coding formats in a given embodiment. In other embodiments, a single decoder may be used to support multiple optical disk formats.

Information signals read out from the optical disk 104 are processed by decoders 124 to generate video signals or other image signals suitable for presentation on display device 125. The display device may comprise, for example, a television, computer, mobile telephone, or any other processing device having an ability to display video or other information read out from the optical disk 104 via the optical pickup unit 102.

The system elements 102, 120, 122 and 124 may comprise elements of an otherwise conventional optical disk playback device, such as a Blu-ray player that is also backwards compatible with the DVD format. One or more such elements may be implemented in a processing device such as the television, computer, mobile telephone, or other processing device that provides the display device 125.

System elements such as optical detectors 114, processor 120, memory 122 and decoders 124 may be implemented at least in part in the form of one or more integrated circuits, such as an otherwise conventional system-on-chip (SOC) integrated circuit designed for use in an optical disk player or other optical disk playback device and suitably modified to support 3D playback functionality as disclosed herein.

In an integrated circuit implementation of the invention, multiple integrated circuit dies are typically formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered part of this invention.

As noted above, a problem that can arise in conventional optical disk playback devices is that such devices are generally unable to generate 3D image signals solely from the stored 2D image information on a 2D optical disk such as optical disk 104.

The present embodiment overcomes this significant problem of the prior art at least in part by configuring an optical assembly comprising optics 112 to direct incident light from the first and second lasers 110 so as to form respective first and second scanning spots on a surface of the optical disk 104, and to direct corresponding reflected light from the first and second scanning spots on the surface of the optical disk 104 to respective ones of the optical detectors 114. These optical detectors 114 are configured to process the reflected light from the respective first and second scanning spots to generate respective first and second data streams. Controller circuitry illustratively comprising at least portions of processor 120 and decoders 124 is configured to generate a 3D image signal from the first and second data streams.

The optical disk playback system 100 as illustrated in FIG. 1 may include other elements in addition to or in place of those specifically shown, including one or more elements of a type commonly found in a conventional implementation of such a system. These and other conventional elements, being well understood by those skilled in the art, are not described in detail herein. It should therefore be understood that the particular arrangement of elements shown in FIG. 1 is presented by way of illustrative example only. Accordingly, those skilled in the art will recognize that a wide variety of other optical disk playback system configurations may be used in implementing the invention.

For example, alternative embodiments of the invention may include only a single laser, with multiple incident light beams being generated from the output of the single laser using optical elements such as a polarizing beam splitter.

Figure 2:
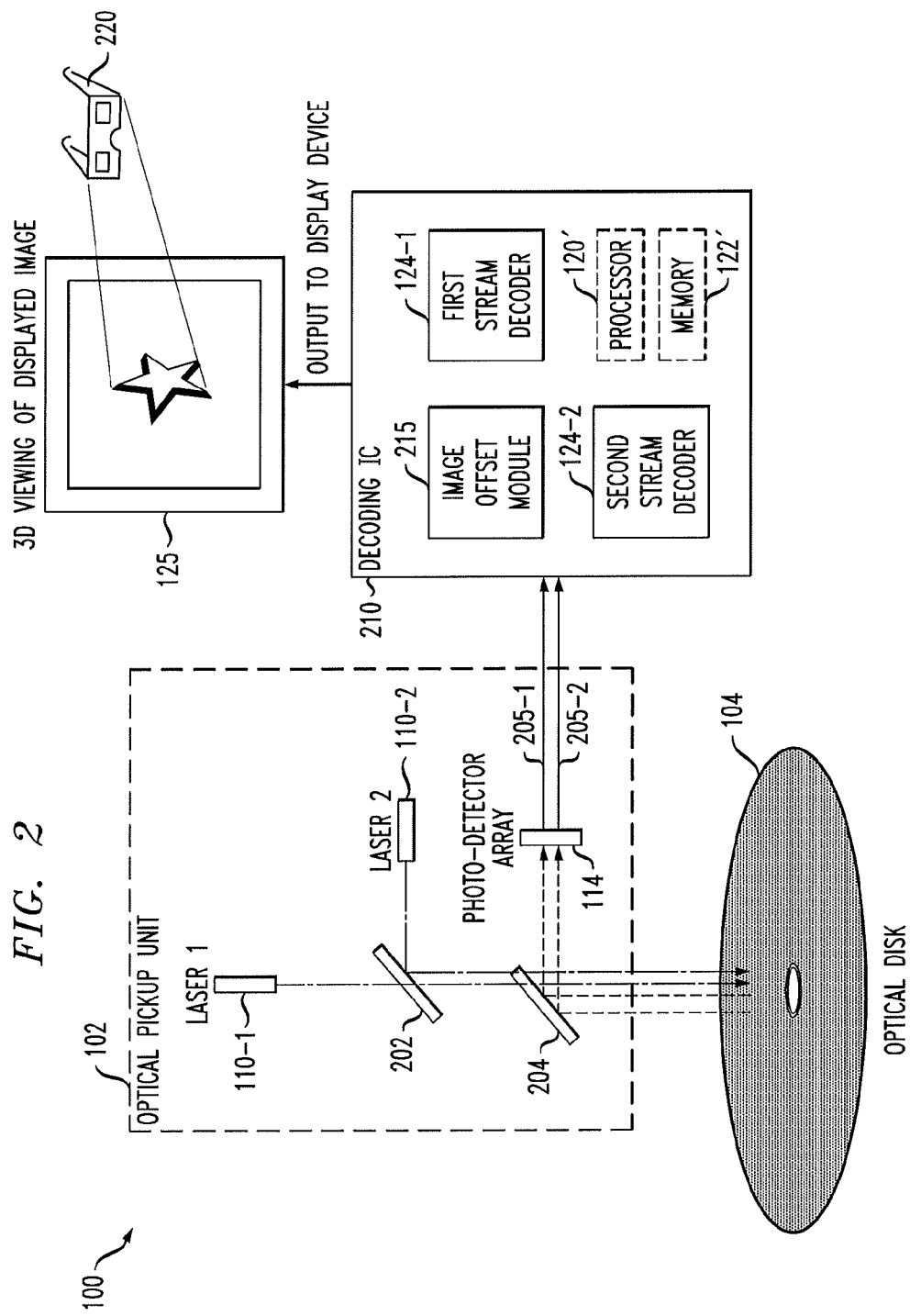
FIG. 2 shows a more detailed view of a portion of the FIG. 1 system, illustrating the formation of first and second scanning spots by an optical pickup unit on a surface of an optical disk and the generation of a 3D image signal using reflected light from the first and second scanning spots.

FIG. 2 shows a more detailed view of the optical pickup unit 102 and illustrates the formation of first and second scanning spots on a surface of the optical disk 104. In this figure, the first and second lasers are more specifically identified as lasers 110-1 and 110-2, respectively, and as noted above may comprise lasers configured for reading of Blu-ray or DVD optical disks, or other types of optical disks. The lasers 110-1 and 110-2 may therefore comprise, for example, a pair of blue lasers each having a wavelength of about 400 nanometers and configured for reading a Blu-ray disk, or a pair of red lasers each having a wavelength of about 650 nanometers and configured for reading a DVD optical disk. The first and second scanning spots formed using incident light from the respective first and second lasers 110-1 and 110-2 at least partially overlap one another on the surface of the optical disk 104, although in other embodiments the scanning spots need not be overlapped with one another.

The optical detectors 114 are more specifically identified in the present embodiment as comprising a single photo-detector array, although other embodiments may utilize separate first and second photo-detector arrays for detecting the reflected light from respective ones of the first and second scanning spots, as indicated previously. Thus, the optical detectors 114 may comprise a single photo-detector array or multiple photo-detector arrays, and possibly additional associated circuitry, for generating first and second data streams using the reflected light from the respective first and second scanning spots. Accordingly, a given optical detector may comprise additional electronic circuitry, such as driver circuitry, level-shifting circuitry, conversion circuitry, or other types of circuitry, that is coupled to or incorporated into a photo-detector array and may be utilized in providing first and second data streams based on the light detected from the first and second scanning spots. Such circuitry is intended to be encompassed by the general term "optical detector" as used herein.

The optics 112 in this embodiment more specifically comprise optical elements 202 and 204 which are arranged for directing light from the lasers 110 to the optical disk 104 and from the optical disk 104 to the photo-detector array 114. More specifically, the optics 112 direct the incident light from the first laser 110-1 to form the first scanning spot and direct the corresponding reflected light from the first scanning spot to the photo-detector array 114. Similarly, the optics 112 direct the incident light from the second laser 110-2 to form the second scanning spot and direct the corresponding reflected light from the second scanning spot to the photo-detector array 114.

The optical element 204 as shown illustratively comprises an optical element that passes light arriving from one direction and reflects light arriving from the opposite direction. For example, optical element 204 directs incident light from lasers 110-1 and 110-2 to the surface of the optical disk 104 and directs the corresponding reflected light from the surface of optical disk 104 to the photo-detector array 114. However, it is to be understood that a wide variety of alternative arrangements of optical elements may be used to direct incident and reflected light in the optical pickup unit 102. Such arrangements of optical elements are all intended to be encompassed by the general term "optical assembly" as used herein.

Both the first and second scanning spots are used to read substantially the same image information from the optical disk 104. The photo-detector array 114 generates two related data streams 205-1 and 205-2 for application to a decoding integrated circuit (IC) 210, with one of the data streams representing the image information read from the optical disk 104 using light from the first laser 110-1, and the other representing the image information read from the optical disk 104 using light from the second laser 110-2. Thus, the data streams 205-1 and 205-2 may be two separate and independent data streams that contain substantially the same information.

The decoding IC 210 in the present embodiment may comprise at least a portion of each of the processor 120 and the memory 122 of FIG. 1. These processor and memory components of the decoding IC are denoted as processor 120' and memory 122' in FIG. 2, and may be used to implement at least a portion of the decoders 124 and/or image offset module 215.

Although the first and second data streams 205-1 and 205-2 contain substantially the same image information read from the optical disk 104, these streams are configured or processed in a manner that supports 3D playback functionality within the system 100. For example, in one embodiment, the optics 112 comprising optical elements 202 and 204 are configured to introduce a phase shift between respective polarizations of the incident light from the first and second lasers 110-1 and 110-2. More specifically, such a phase shift may be introduced by configuring the optics 112 such that polarization of the incident light from the first laser 110-1 is approximately 90° out of phase with polarization of the incident light from the second laser 110-2. One skilled in the art will appreciate that the optical elements of the optics 112 can be arranged in a straightforward manner to introduce such phase differences between optical signals. As will be described below, the two independent data streams 205-1 and 205-2 formed using the reflected light from the first and second lasers 110-1 and 110-2 are processed by the decoding IC 210 to be presented as overlapping yet appropriately offset images so as to support 3D playback.

Instead of or in addition to introducing a phase shift between the respective polarizations of the incident light from the lasers 110-1 and 110-2 as described above, the system 100 may be configured to introduce at least one of a phase offset and a color offset between a first image generated from the first data stream 205-1 and a second image generated from the second data stream 205-2. Such images are generated in the decoding IC 210 using respective first stream decoder 124-1 and second stream decoder 124-2, which may be conventional decoders such as H.264, MPEG-2 and/or MPEG-4 decoders.

The decoding IC 210 further comprises an image offset module 215 for introducing the phase offset or color offset between the first and second images from the first stream decoder 124-1 and the second stream decoder 124-2. The phase or color offset introduced between the first and second images in the decoding IC 210 provides a 3D image signal output to the display 125. This 3D image signal comprises the offset images generated from the first and second streams 205-1 and 205-2. A user equipped with appropriately polarized 3D viewing glasses 220 is therefore provided with a 3D viewing experience when viewing the displayed 3D image signal, even though the optical disk 104 is only a 2D optical disk storing 2D optical information. For example, in an embodiment in which a color offset is introduced between the first and second images, these images are presented as part of the 3D image signal in different but complementary color schemes in order to provide the 3D viewing experience.

The data streams 205-1 and 205-2 may comprise, for example, encoded bitstreams having non-stereo compression profiles. The image offset module 215 may be configured to perform parallax adjustment on those bitstreams. This may involve addition of depth through image segmentation of the frame background, analysis of luminosity, or other image processing techniques. For example, the image offset module 215 may also or alternatively be configured to use a motion estimation technique to provide relative shifts between frames from the two bitstreams in accordance with measured parallax.

It should be noted that certain existing optical playback devices, such as Blu-ray players, are typically configured to process dual data streams. Such existing processing functionality can be adapted for use in processing the first and second data streams 205-1 and 205-2 so as to provide 3D playback functionality of the type described herein.

As mentioned previously, embodiments of the present invention can use both optics 112 and image offset module 215 to configure the first and second images to support 3D playback functionality. For example, a polarization phase difference between the incident light from the lasers 110-1 and 110-2 can be provided by the optics 112, and then phase or color offset between the corresponding images can be adjusted as necessary using the image offset module 215.

Figure 3:
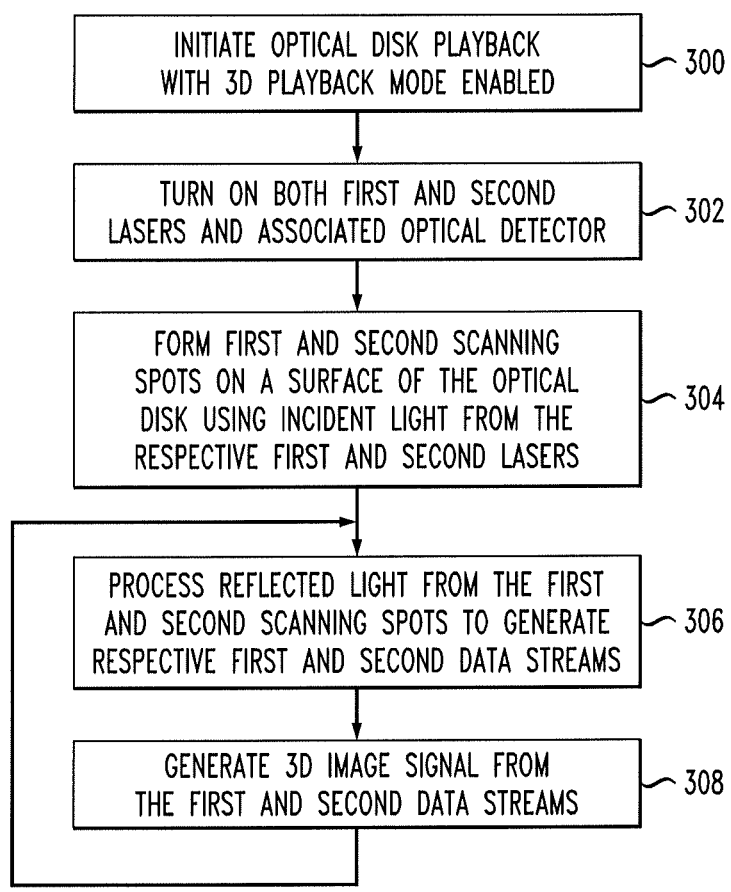
FIG. 3 is a flow diagram showing a process associated with an exemplary 3D playback mode of operation of the FIG. 1 system.

Referring now to FIG. 3, a flow diagram is shown of a process implemented in the optical playback system 100. The process is performed by the system 100 under the control of processor 120 in an operating mode involving 3D playback of the 2D optical disk 104. The process includes steps 300 through 308. One or more of the steps may be carried out responsive to execution of corresponding software code in the processor 120.

In step 300, optical disk playback is initiated with the 3D playback mode enabled. This may involve, for example, a user inserting the optical disk 104 in a disk drive and manipulating appropriate playback device control inputs to select the 3D playback mode. Thus, a playback device configured in accordance with the invention may provide a user with selectable options to enable or disable generation of the second scanning spot and thereby to enable or disable the 3D playback functionality of the playback device. Such options may be provided through suitable modification of an otherwise conventional user interface of the playback device. Alternatively, the playback device may be configured such that the 3D mode of playback is automatically enabled any time playback is selected.

In step 302, the first and second lasers 110-1 and 110-2 and their associated optical detector 114 are turned on.

In step 304, the first and second scanning spots are formed on the surface of the optical disk 104 using incident light from the respective first and second lasers 110-1 and 110-2. Although shown as a separate step in the figure, step 304 may be carried out by simply turning on the lasers and detector in step 302. The scanning spot formation step 304 may additionally or alternatively involve some movement or other adjustment of the positioning of one or more elements of the optics 112, as well as adjusting the speed of rotation of the optical disk 104 until it reaches an appropriate readout speed.

In step 306, reflected light from the first and second scanning spots is processed in the detector 114 to generate the first and second data streams 205-1 and 205-2 that are provided to the decoding IC 210. The readout of stored information from optical disk 104 using each of the first and second scanning spots may be performed in a well-known conventional manner, and is therefore not described in detail herein.

In step 308, a 3D image signal is generated in the decoding IC 210 and provided to the display 125. This will generally involve decoding each of the first and second data streams 205-1 and 205-2 in the respective first and second stream decoders 124-1 and 124-2, and possibly introducing at least one of a phase offset and a color offset between the resulting images in the image offset module 215. The resulting 3D image when presented on display 125 provides the user with a 3D viewing experience.

The particular process steps and their ordering as illustrated in FIG. 3 may be varied in other embodiments. For example, steps that are shown as being performed sequentially in FIG. 3 may instead be performed at least in part in parallel with one another. Numerous alternative or additional steps may be used.

Although illustrative embodiments described in conjunction with FIGS. 1 and 2 utilize multiple lasers, other embodiments of the invention may utilize only a single laser. For example, optics comprising one or more polarizing beam splitters and other associated optical elements may be used to generate two separate beams of incident light from a single laser, such as a single blue laser in a Blu-ray player or a single red laser in a DVD player. Thus, the embodiments of FIGS. 1 and 2 could be adapted in a straightforward manner to operate with a single laser, through appropriate configuration of the optics 112.

It was indicated previously that at least a portion of the system 100 may be embodied in an otherwise conventional optical disk playback device, such as a Blu-ray player that is also backward compatible with the DVD format. In an arrangement of this type, the optical disk player may comprise two separate playback mechanisms, one for playing back DVDs and the other for playing back Blu-ray disks. Such separate playback mechanisms can be adapted for use in generating first and second scanning spots for supporting a 3D playback mode of operation in the associated optical disk player as disclosed herein.

Again, it should be emphasized that the above-described embodiments of the invention are intended to be illustrative only. For example, other embodiments can use different types and arrangements of lasers, optics, detectors and controller circuitry. Also, different types of image offsets and associated 3D image signal generation techniques may be used. These and numerous other alternative embodiments within the scope of the following claims will be apparent to those skilled in the art.

What is claimed is:

1. An optical disk playback device comprising:
   one or more lasers;
   an optical assembly;
   an optical detector; and
   controller circuitry coupled to the optical detector;
   the optical assembly being configured to direct incident light from the one or more lasers so as to form first and second scanning spots on a surface of an optical disk;
   the optical assembly being further configured to direct corresponding reflected light from the first and second scanning spots on the surface of the optical disk to the optical detector;
   wherein the optical detector is configured to process the reflected light from the first and second scanning spots to generate respective first and second data streams; and
   wherein the controller circuitry is configured to generate a three-dimensional image signal from the first and second data streams.

2. The device of claim 1 wherein the first and second scanning spots at least partially overlap one another on the surface of the optical disk.

3. The device of claim 1 wherein the one or more lasers comprise first and second lasers.

4. The device of claim 3 wherein polarization of the incident light from the first laser is approximately 90° out of phase with polarization of the incident light from the second laser, 5. The device of claim 3 wherein polarization of the incident light from the first laser has approximately the same phase as polarization of the incident light from the second laser.

6. The device of claim 3 wherein the first and second lasers are configured to generate the incident light at substantially the same wavelength, 7. The device of claim 6 wherein at least one of the first and second lasers comprises a blue laser having a wavelength of approximately 400 nanometers.

8. The device of claim 3 wherein the first and second lasers are configured to generate the incident light at different wavelengths.

9. The device of claim 3 wherein at least one of the first and second lasers has a wavelength particularly adapted for reading stored information from a first type of optical disk that is not configured for three-dimensional playback.

10. The device of claim 9 wherein the first type of optical disk is a Blu-ray optical disk configured for two-dimensional playback.

11. The device of claim 1 wherein the controller circuitry generates the three-dimensional image signal by introducing a phase offset between an image generated from the first data stream and an image generated from the second data stream.

12. The device of claim 1 wherein the controller circuitry generates the three-dimensional image signal by introducing a color offset between an image generated from the first data stream and an image generated from the second data stream.

13. The device of claim 1 wherein the optical detector comprises a first photo-detector array configured to generate the first data stream using the reflected light from the first scanning spot and a second photo-detector array configured to generate the second data stream using the reflected light from the second scanning spot.

14. An optical disk playback system comprising the optical disk playback device of claim 1.

15. A method comprising:
   forming first and second scanning spots on a surface of an optical disk using incident light from one or more lasers;
   processing the reflected light from the first and second scanning spots to generate respective first and second data streams; and
   generating a three-dimensional image signal from the first and second data streams.

16. The method of claim 15 wherein the step of forming first and second scanning spots further comprises configuring first and second lasers to form the respective first and second scanning spots such that polarization of the incident light from the first laser is approximately 90° out of phase with polarization of the incident light from the second laser.

17. The method of claim 15 wherein the step of forming first and second scanning spots further comprises operating first and second lasers at substantially the same wavelength to form the respective first and second scanning spots.

18. The method of claim 15 wherein the step of generating the three-dimensional image signal further comprises introducing a phase offset between an image generated from the first data stream and an image generated from the second data stream.

19. The method of claim 15 wherein the step of generating the three-dimensional image signal further comprises introducing a color offset between an image generated from the first data stream and an image generated from the second data stream.

20. A non-transitory computer-readable storage medium having embodied therein executable code for performing steps of:
   forming first and second scanning spots on a surface of an optical disk using incident light from one or more lasers;
   processing the reflected light from the first and second scanning spots to generate respective first and second data streams; and
   generating a three-dimensional image signal from the first and second data streams.

* * * * *